United States Patent
Shadwell et al.

(10) Patent No.: US 9,822,809 B2
(45) Date of Patent: Nov. 21, 2017

(54) UNIVERSAL FASTENER FOR DECKING

(71) Applicant: Handy & Harman, White Plains, NY (US)

(72) Inventors: Peter J. Shadwell, Longmeadow, MA (US); Michael W. Maziarz, Wilbraham, MA (US)

(73) Assignee: Handy & Harman, White Plains, NY (US)

( * ) Notice: Subject to any disclaimer, the term of this patent is extended or adjusted under 35 U.S.C. 154(b) by 158 days.

(21) Appl. No.: 14/434,268

(22) PCT Filed: Oct. 9, 2013

(86) PCT No.: PCT/US2013/064006
§ 371 (c)(1),
(2) Date: Apr. 8, 2015

(87) PCT Pub. No.: WO2014/058958
PCT Pub. Date: Apr. 17, 2014

(65) Prior Publication Data
US 2015/0275951 A1    Oct. 1, 2015

Related U.S. Application Data

(60) Provisional application No. 61/711,243, filed on Oct. 9, 2012, provisional application No. 61/779,071, filed on Mar. 13, 2013.

(51) Int. Cl.
*F16B 15/00* (2006.01)
*F16B 15/08* (2006.01)
(Continued)

(52) U.S. Cl.
CPC ........ *F16B 15/08* (2013.01); *E04F 15/02044* (2013.01); *F16B 15/0038* (2013.01);
(Continued)

(58) Field of Classification Search
CPC .. F16B 15/0076; F16B 15/0023; F16B 15/08; F16B 2015/0076; E04F 2015/02094
(Continued)

(56) References Cited

U.S. PATENT DOCUMENTS 352,000 A * 11/1886 Penfold .................... B65D 9/32
16/220
804,825 A * 11/1905 Brooks ................. G09F 3/0352
16/202
(Continued)

FOREIGN PATENT DOCUMENTS

EP        2228504 A2    9/2010
JP      2008-31757 A    2/2008
(Continued)

OTHER PUBLICATIONS

Supplementary Partial European Search Report dated Jun. 9, 2016 (European Application No. 13844963.2).
(Continued)

*Primary Examiner* — Flemming Saether
(74) *Attorney, Agent, or Firm* — Alix, Yale & Ristas, LLP

(57) ABSTRACT

A fastener for attaching grooved decking planks to a support member has a body defining an attachment opening spacing apart opposing legs extending from a shoulder. The legs have at least one frontward extending prong. The rear end of the body includes a bend transitioning to a lip. The front end may have downward extending teeth. A nose may extend from the front end while a tail may extend from the rear end of the body. Adjacent fasteners may be joined by their respective noses and tails to form a collated series of fasteners.

21 Claims, 10 Drawing Sheets

(51) Int. Cl.
*F16B 43/00* (2006.01)
*E04F 15/02* (2006.01)
*E04F 15/04* (2006.01)
*F16B 5/00* (2006.01)

(52) U.S. Cl.
CPC ........ *F16B 43/00* (2013.01); *E04F 15/02183* (2013.01); *E04F 15/04* (2013.01); *E04F 2015/02094* (2013.01); *E04F 2015/02122* (2013.01); *F16B 5/0064* (2013.01); *F16B 2015/0076* (2013.01)

(58) Field of Classification Search
USPC ........ 411/457, 471, 442–444, 461, 466, 469, 411/456; 52/489.1, 489.2, 512, 715
See application file for complete search history.

(56) References Cited

U.S. PATENT DOCUMENTS

| | | | | |
|---|---|---|---|---|
| 1,407,709 A | * | 2/1922 | Tibbals | F16B 15/08 206/343 |
| 1,714,738 A | * | 5/1929 | Smith | E04F 15/04 52/512 |
| 1,790,348 A | * | 1/1931 | Jewell | E04F 13/0835 411/471 |
| 1,939,631 A | * | 12/1933 | Randall | B21D 53/36 16/16 |
| 2,433,914 A | * | 1/1948 | Lang | F16B 15/08 206/343 |
| 4,165,673 A | * | 8/1979 | Shue, Jr. | F16B 35/00 411/176 |
| 4,220,070 A | * | 9/1980 | Anstett | F16B 15/08 411/444 |
| 5,243,804 A | | 9/1993 | Therrien et al. | |
| 8,256,614 B1 | * | 9/2012 | Wadsworth, Sr. | F16B 15/08 206/340 |
| 8,555,570 B2 | | 10/2013 | Martel | |
| 2004/0045244 A1 | | 3/2004 | Hafner | |
| 2004/0187425 A1 | * | 9/2004 | Kozyrski | B27F 7/15 52/633 |
| 2006/0059822 A1 | | 3/2006 | Guffey | |
| 2011/0314765 A1 | | 12/2011 | Martel | |

FOREIGN PATENT DOCUMENTS

| | | |
|---|---|---|
| WO | 8401985 A1 | 5/1984 |
| WO | 2011027735 A1 | 3/2011 |

OTHER PUBLICATIONS

International Search Report and Written Opinion dated Jan. 17, 2014 (PCT/US2013/064006).

* cited by examiner

UNIVERSAL FASTENER FOR DECKING

CROSS-REFERENCE TO RELATED APPLICATIONS

This application claims priority to U.S. Provisional Application Nos. 61/711,243, filed Oct. 9, 2012, and 61/779,071, filed Mar. 13, 2013, the contents of which are hereby incorporated by reference in their entireties

BACKGROUND

The invention relates to deck plank fasteners or clips for securing a deck plank to a joist and for supporting deck planks relative to one another. More particularly, the invention relates to a hidden deck plank fastener for use with deck planks having undercut side grooves which vary widely in terms of dimensions and material properties.

Hidden deck plank fasteners for planks with undercut side groove exist, and are typically specific to a type of plank, groove dimension, nub dimension, material, amongst other variables. It would be useful to have a fastener that is compatible with planks having different styles, groove types and dimensions, and materials.

SUMMARY

An embodiment of the fastener has a body extending from a front end to a rear end. The body has a generally flat portion defining a plane extending between two opposing edges. An attachment opening extends from a top surface to a bottom surface of the body. A first bellow extends from one edge of the body and transitions to a downwardly projecting first leg. An opposite second below extends from the opposite edge to a downwardly projecting second leg. Each leg has at least one prong projecting from a front edge thereof.

Another embodiment includes a series of fasteners. A first fastener has a body extending from a front end to a rear end. The body has a generally flat portion defining a first plane that extends between two opposing edges. The rear end has a tail projected rearward therefrom. The body defines an attachment opening extending from a top surface to a bottom surface thereof. A first leg extends obliquely from one edge of the body while an opposite second leg extends obliquely from the other edge of the body and includes an alignment member. A second fastener has a body extending from a front end to a rear end. The body has a generally flat portion defining a first plane that extends between two opposing edges. The front end has a nose projecting frontward therefrom. The body defines an attachment opening extending from a top surface to a bottom surface thereof. A first leg extends obliquely from one edge of the body while an opposite second leg extends obliquely from the other edge of the body and includes an alignment member. The first fastener tail is attached to the second fastener nose such that the first and second fasteners are positioned with the first and second planes being coplanar.

DETAILED DESCRIPTION

With reference to the drawings wherein like numerals represent like parts throughout the Figures, a universal fastener for use with a variety of decking planks and a collated series of universal fasteners is disclosed.

Figure 1:
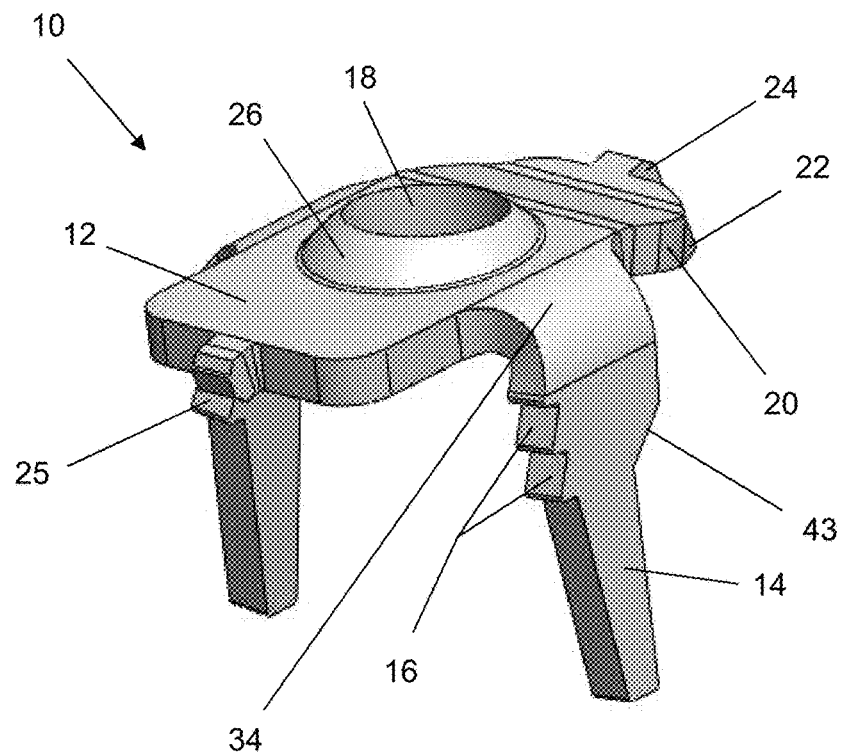
FIG. 1 shows a perspective view of a universal fastener according to the disclosure.

FIG. 1 depicts a first embodiment of the disclosed universal hidden fastener 10. As shown, the fastener has a body 12 and two opposing downwardly extending legs 14, each having frontward extending side prongs 16. The body 12 defines a generally planar top surface 13a and generally planar bottom surface 13b, and an attachment opening 18 extending therethrough. As shown, the generally flat or planar portion of the body 12 transitions to lip 22 via a bend 20 toward the rear end.

This embodiment includes a tail 24 extending from the lip 22 at the rear end and a nose 25 extending from the opposite front end. The tail 24 and nose 25 will be discussed in further detail below with reference to FIGS. 3A and 3B. Embodiments of the fastener exist with only a nose or only a tail, also described further below.

Here, the attachment opening 18 is surrounded, at least partially, by a radial dome or dimple 26. In the embodiments depicted in the Figures, the opening 18 is a bore that extends substantially perpendicularly through the flat body portion of the fastener. As shown, the bore opening 18 is rearwardly offset from the central axis of the dimple 26, thereby providing an angled radial surface. In the depicted embodiment, the radial surface is angled downwardly from the front/nose end toward the rear/tail end). Alternative embodiments exist with a bore that is angled obliquely relative to the flat body portion or centered relative to the dimple. However, the depicted preferred embodiment has been shown to exhibit particularly favorable fastener attachment properties during deck assembly. The angled surface of the dimple assists in promoting an advantageous angle of drive of a securing member during installation.

Figure 2:
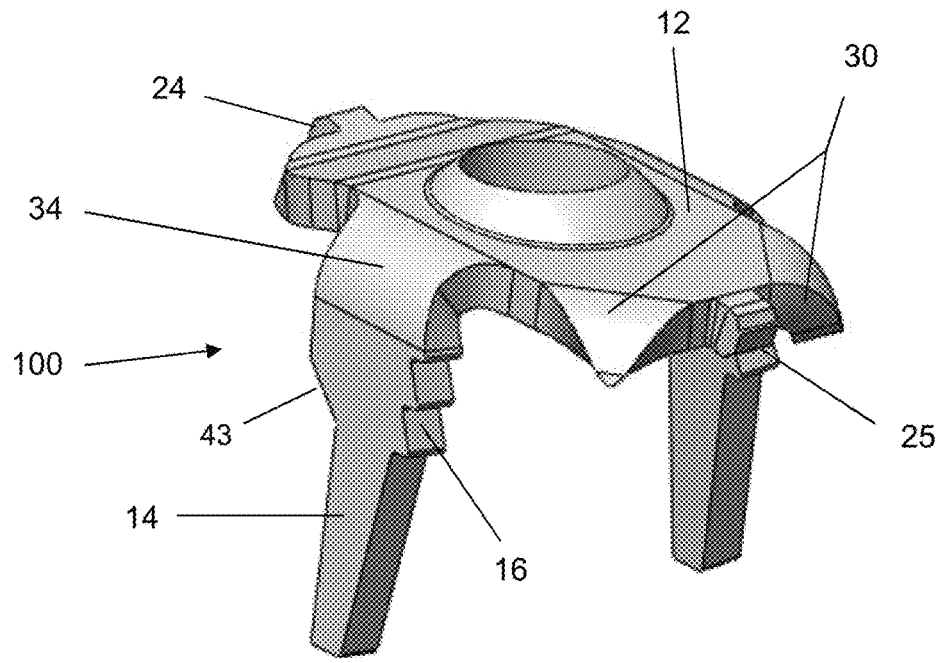
FIG. 2 shows a perspective view of another embodiment of the disclosed universal fastener.

The embodiment of the fastener 10 shown in FIG. 1 is substantially flat at the front end. As shown in FIG. 2, the fastener 100 may include teeth 30 extending downward as bends in the opposite front corners of the body. The remaining elements of the fastener 100 are substantially similar to the fastener 10 and thus not identified with separate reference numerals.

Typically, the smooth or flat front end of the fastener 10 is advantageous for use with natural decking planks (such as wooden) because it will not penetrate the wood surface, thereby reducing or preventing splitting of the plank material. The fastener 100 with teeth 30 is advantageous for use with composite decking planks. Penetration of the teeth 30 into composite or similar plank material significantly increases the strength and rigidity of attachment and restrains shifting effects from thermal expansion and contraction.

Figure 3:
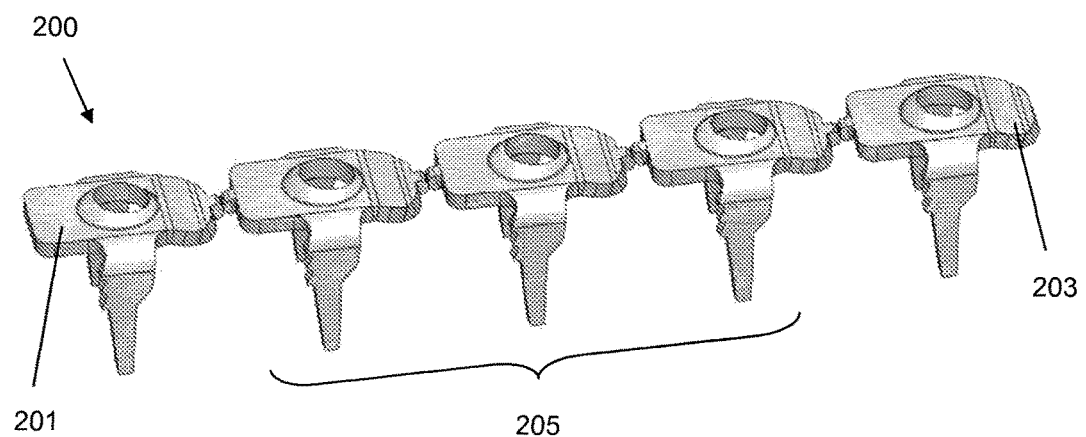
FIG. 3 is a perspective view of a series of universal fasteners of FIG. 1.
Figure 17:
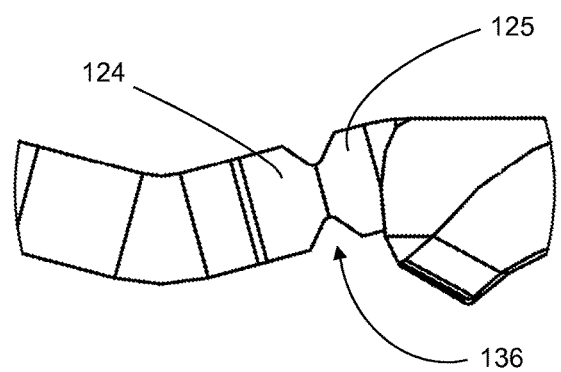
FIG. 17 is an enlarged view of the nose-to-tail attachment of adjacent fasteners in the collated series.
Figure 18A:
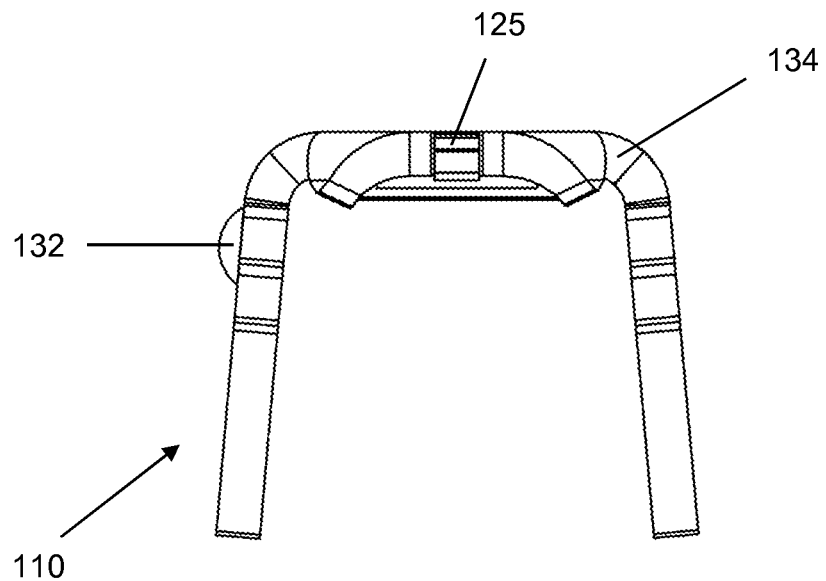
FIG. 18A shows a front elevation view of the fastener of FIG. 10.
Figure 18B:
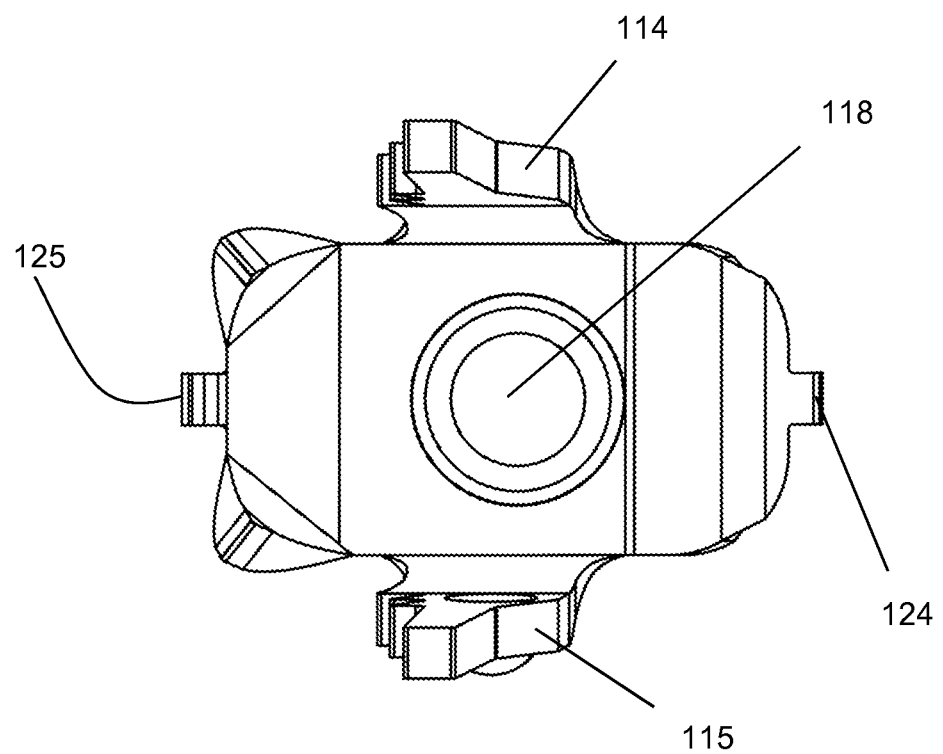
FIG. 18B is a bottom elevation view of the fastener shown in FIG. 18A.

FIG. 3 depict a collated series 200 of universal fasteners. The fasteners that form the depicted series 200 are similar to the embodiment of FIG. 1 (no teeth projecting from the body). Clearly, fasteners with teeth may be attached at adjacent nose/tail interfaces to form a similar collated series as well. As shown, the lead fastener 201 may not include a nose extending from its front end, whereas the trailing fastener 203 may not include a tail, since neither is attached to an adjacent fastener at the respective position. Conversely, each of the intermediate fasteners, represented generally as reference numeral 205 in FIG. 3A, includes both a nose and a tail (essentially equivalent to the embodiment of fastener from FIG. 1). As shown, each fastener in the collated series is connected to the adjacent fastener(s) via attachment of the nose with an adjacent tail and/or vice versa. Thus it can be appreciated that a nose is unnecessary on the leading fastener 201, as a tail is unnecessary on the trailing fastener 203. It can also be appreciated that any of the fasteners may include both a nose and tail to accommodate preferred manufacturing and tooling techniques. FIG. 3A depicts a series with five fasteners total (three intermediate fasteners between a lead fastener 201 and a trailing fastener 203), but the depicted number of fasteners in a single collated series is non-limiting. FIG. 17 is an enlargement of a representative tail 24 of a fastener joined to an adjacent nose 25 of another fastener. As can be seen, the collation includes a notch 136 cut into the top and bottom portions of the metal forming the adjacent tail and nose which assists in separation of the adjacent clips during attachment of a fastener to a plank, typically by driving an elongated securing member through the attachment opening of the lead fastener (described in further below).

FIGS. 4-9 collectively depict the steps of a typical installation of a decking surface with the disclosed universal fastener.

Figure 4:
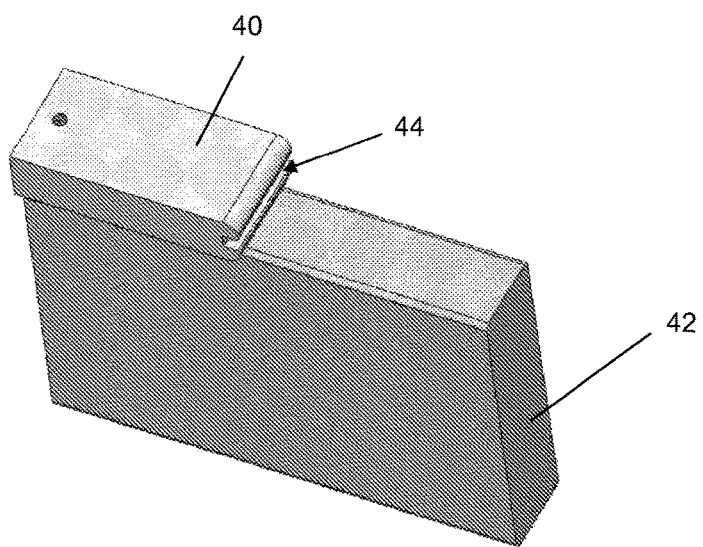
FIGS. 4-9 display the representative steps of a typical assembly of a decking structure using the disclosed universal fastener.
Figure 5:
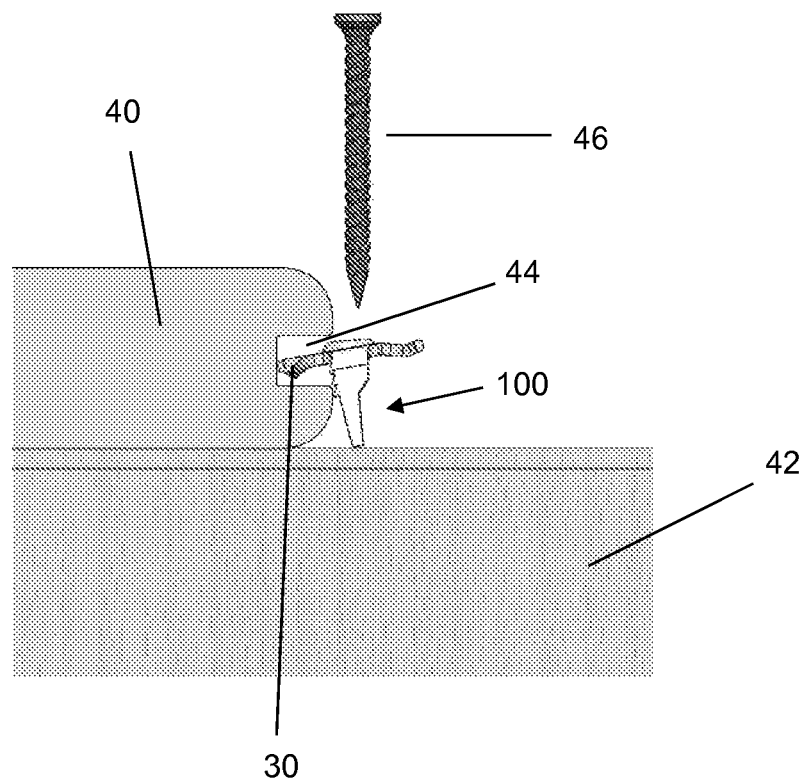

FIG. 4 shows a section of a first grooved decking plank 40 on a support member 42, such as a joist (also in sectional view). As represented in FIG. 5, the front end of the fastener 100 with teeth 30 is inserted into the groove 44 and an elongate securing member (such as a screw or nail) 46 is driven through the attachment opening 18 (not seen in FIG. 5) and into the joist 42. The downward force of the securing member 46 drives the legs 14 to penetrate the joist surface. The downward penetration of the legs 14 is stopped by the lower surface of the fastener body 12 abutting or mating substantially flush with the lower nub of the decking plank, as shown best in FIG. 6.

Figure 6:
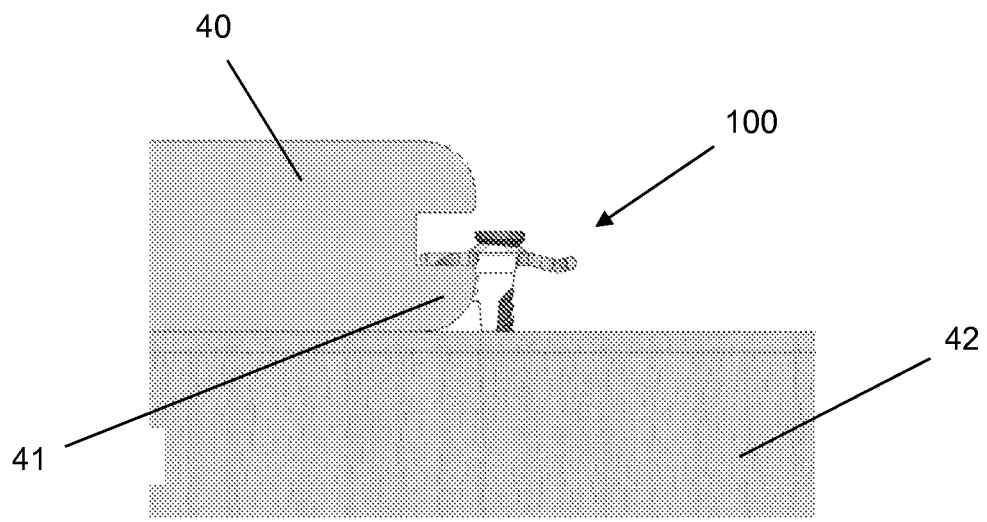
Figure 7:
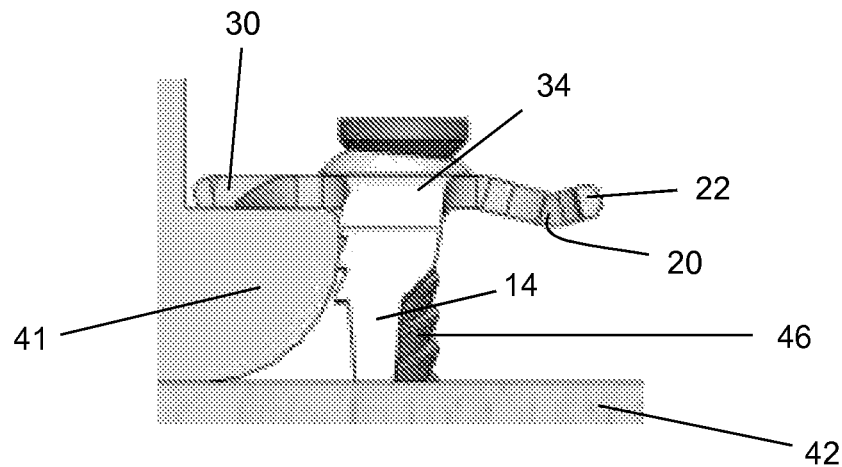

FIG. 6 shows a universal fastener 100 installed in groove of a decking plank, attaching the plank 40 to the support member 42. The front end (here, with teeth 30 penetrating into the lower plank nub 41) traps the lower nub 41, thereby securing the plank to the support member. FIGS. 6 and 7 best show the rear lip 22 "open end" of the installed fastener 100 prior to receipt of a second or trailing decking plank. The enlarged image of FIG. 7 also clearly shows the press-fit between the fastener 100 and the securing member head.

Figure 8:
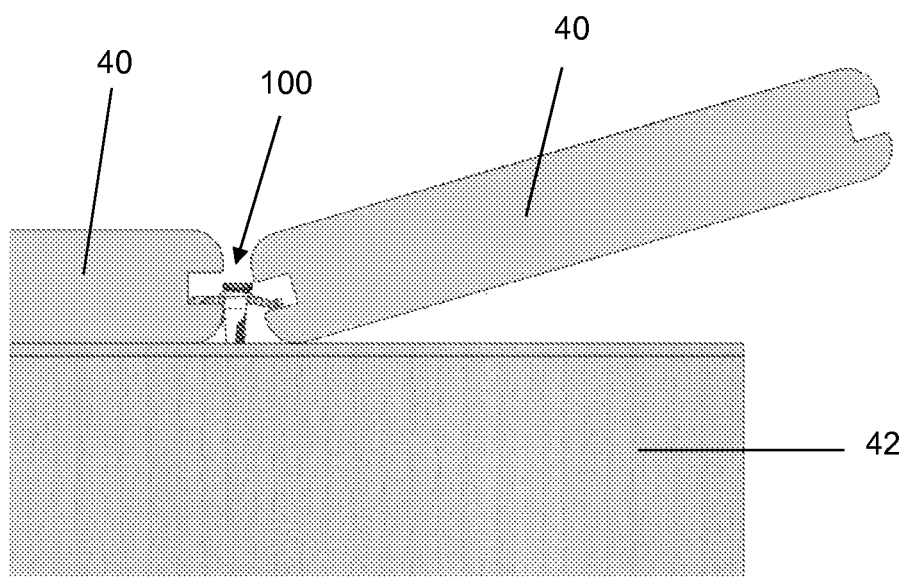
Figure 9:
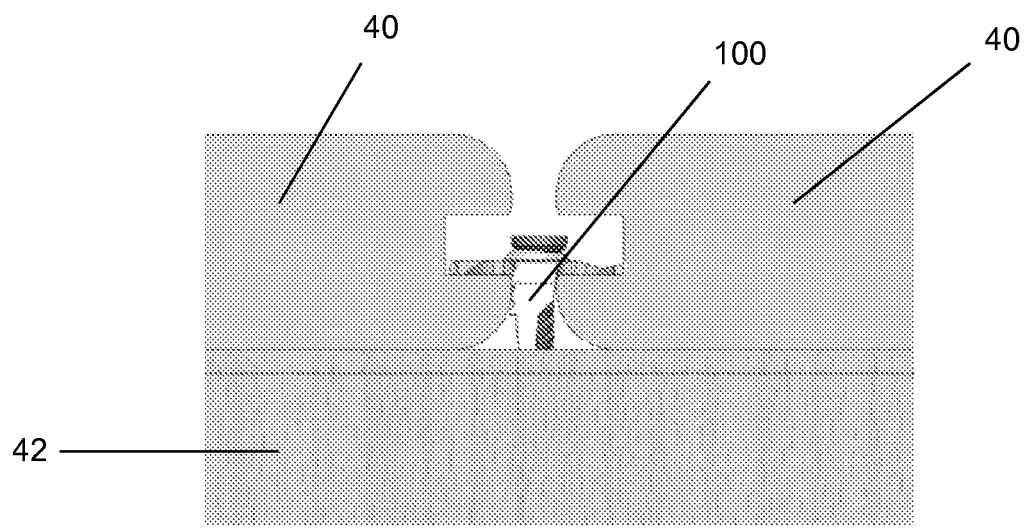

As can be seen with reference to FIGS. 7 and 8, the rear lip 22 provides an opening for sliding the lower nub of a trailing decking plank. FIG. 8 depicts installation of a second decking plank by sliding under the rear lip 22 of the attached fastener. The bend 20 is positioned to trap the lower nub of the trailing decking plank with the support member 42. FIG. 9 shows the installed fastener holding the first and trailing decking planks via compressive downward force against the support member 42, without requiring additional tightening or penetration of the decking planks.

A decking structure is assembled by attaching third, fourth, etc. planks via the same process. Notably, the configuration of the prongs 16, which contact and/or slightly penetrate the lower nub during installation, and the legs 14 with forward extending prongs 16 assist substantially in maintaining the fastener generally level or parallel to the respective planks during attachment with the securing member. The prongs 16 may with or slightly penetrate the front surface of the lower plank nub during mate attachment, as shown most clearly in the enlarged depictions of FIGS. 7 and 9. This is especially advantageous when employed with plank grooves that are lower (i.e., having smaller lower nubs). Attachment of the fasteners with the elongated securing members 46 can be accomplished by employing a power driving tool, much as described in co-owned U.S. application Ser. Nos. 13/030,625, 13/169,175 and 13/532,145.

The collated series of fasteners, like the series 200 depicted in FIG. 3 (collated embodiments also shown in FIGS. 14-16), carries numerous advantages over known individual or loose fasteners. Packaging and handling a relatively rigid collated series is more facile and can be more efficient than numerous individual fasteners. The notched collation (see enlarged portion of FIG. 17, for example) allows and/or promotes severance of the adjacent fasteners. A user can optionally remove a fastener from the series by hand prior to installation. In other embodiments, driving a securing member through the attachment opening simultaneously disengages the subject lead fastener from the adjacent fastener in the series while installing the lead fastener on the plank.

In addition, collated series of fasteners like those depicted can be used within an automatic or semi-automatic track-like feeding system, similar to a magazine in a power driving tool like a nail gun (not depicted). A track-like rail attachment may be attached and positioned appropriately on a power driving tool or even formed within the power tool itself. The track is configured to engage with the collated fastener series such that, as the lead fastener is attached to the decking plank, the remaining fasteners advance down the track automatically, for example by a rear spring or other bias. After advancement of the series, the new lead fastener (the fastener which was adjacent and joined to the installed fastener) is positioned and held in position for an elongated securing member to be driven through its respective attachment opening. The configuration of the generally flat body 12 (and 112 discussed below), legs 14 (and 114, 115 discussed below), and outward bellow (shown as reference numerals 34 and 134) facilitate advancement, stopping, aligning and stabilization of the disclosed fastener or collated series of fasteners at a desired installation position within a rail feeing system of an automatic or manual installation tool. One of skill in the art would readily realize that alternative advancement mechanisms may be employed, such as for example a rotating wheel.

Notably, the variable nature of the penetration of the legs 14 into the joist, as well as the frontward extending prongs 16 allow the disclosed fastener to be used with a large variety of grooved decking planks—planks of different materials and groove styles or sizes.

Figure 10:
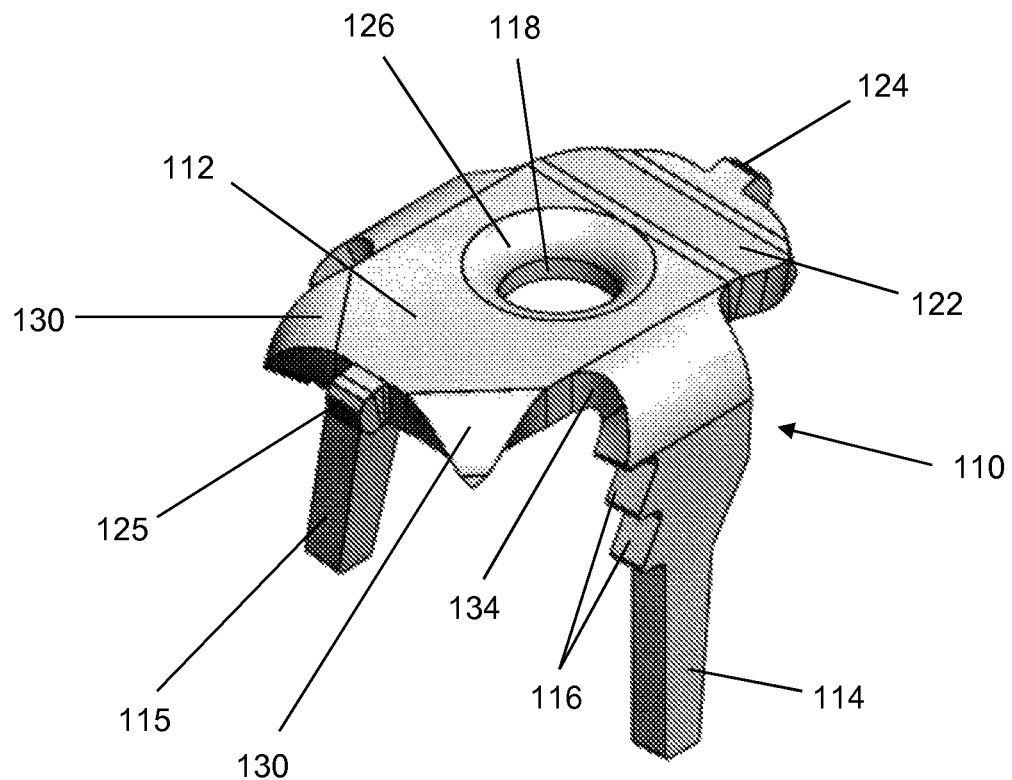
FIG. 10 is a perspective view of another embodiment of the universal fastener.

FIG. 10 shows another embodiment of the disclosed universal fastener 110. The fastener 110 includes a body 112 spacing apart two legs, 114 and 115, which extend downwardly from shoulders 134 on opposite lateral edges of the base 112. Like the previous embodiments, the legs each include a plurality of frontward projecting prongs 116. As shown most clearly in FIGS. 11 and 12, the legs 114 and 115 are angled modestly toward the front end of the fastener 110. More specifically, the legs (114 and 115) have a front edge, shown generally as reference numeral 145 in FIG. 12, angled obliquely forward so that they lie at an angle less than perpendicular to the plane defined by the flat body portion. Preferred embodiments have legs that are angled at approximately 3°-15° from a line perpendicular to the plane defined by the body 112, and more preferably at approximately 5° relative thereto.

Like the previous embodiments, the body 112 has a generally flat portion which transitions to a lip 122 at the rear end for facilitating engagement of a trailing grooved decking plank after the fastener 110 has been used to attach a leading decking plank to a support member (i.e., joist). A typical installation may be performed substantially as shown in FIGS. 4-9 above. The lip has a tail 124 extending therefrom, similar to the tail 24 of the previous embodiments. Also like the previous embodiments, a nose 125 extends outwardly from the front end of the body 112. The front end also includes teeth 130 formed as bends in the opposite lead corners of the body 112. An alternate embodiment exists without the teeth, just as in the previously-disclosed embodiments.

Figure 11:
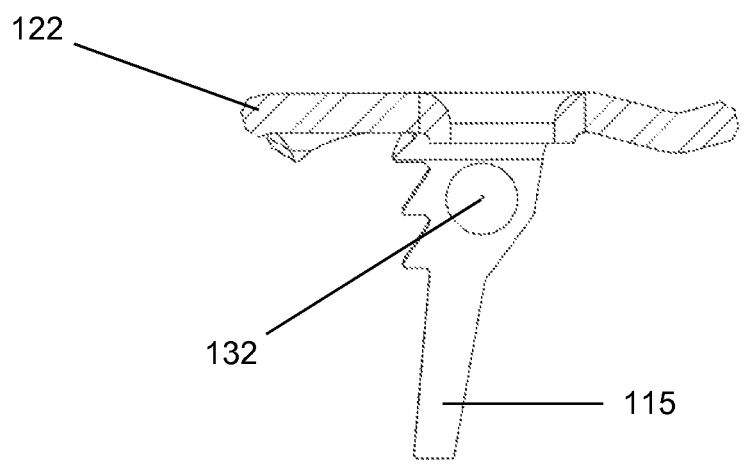
FIG. 11 is an elevation view of one side of the fastener of FIG. 13.
Figure 12:
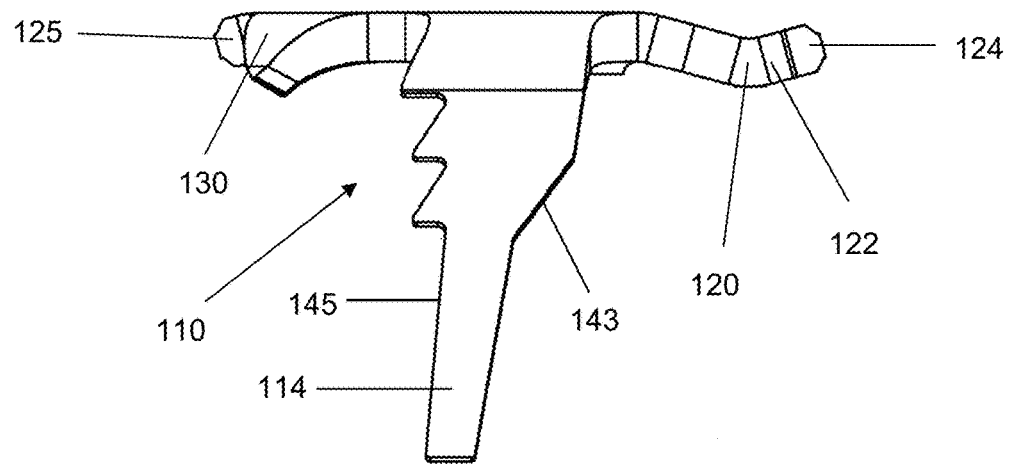
FIG. 12 is an elevation view the opposite side of the fastener from FIG. 11.
Figure 13:
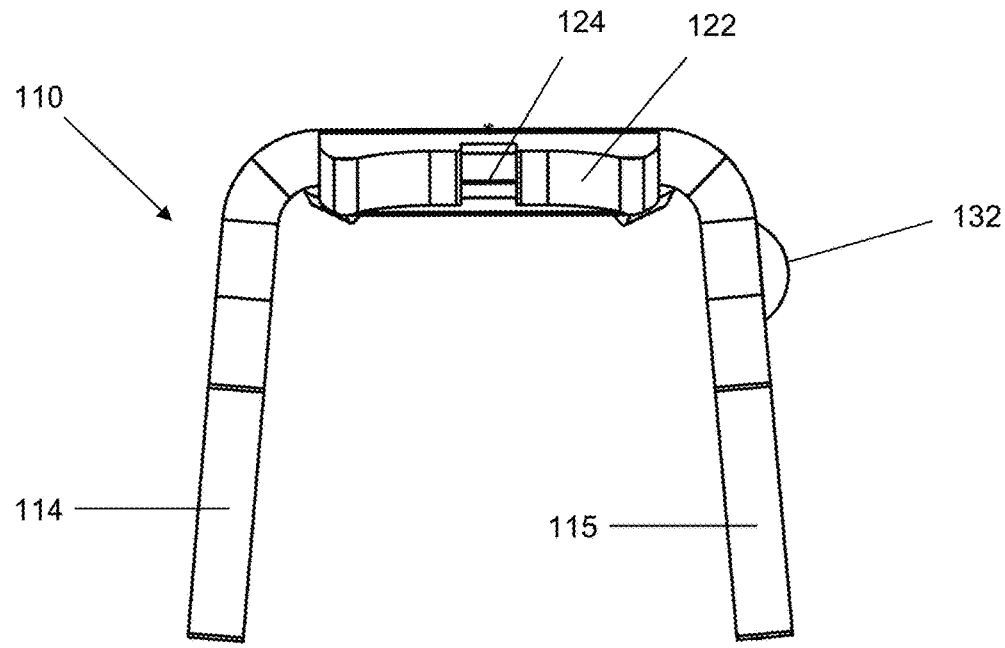
FIG. 13 is an elevation view of the rear side of the fastener of FIGS. 11 and 12.

Shown in FIGS. 11 and 13 is an outwardly projecting dimple 132 in the leg 115. The dimple 132 is formed in one leg (but not both) to provide an element of asymmetry to the fastener 110. The dimple 132 acts as an orientation guide, preventing backward loading of the fastener 110 (or series of fasteners, as will be discussed below) into an appropriately cooperating advancement track of a power driving tool for attachment. A cooperating track has a groove along one side configured to mate with the dimple 132 to guide installation and advancement of the fastener. Other embodiments of an asymmetric guide may be employed, such as for example a groove in one side of the fastener 110 (or one leg) which cooperates with a dimple or extension in the advancement track of the power driving tool. The described asymmetric element may be employed in any of the fastener embodiments of this disclosure.

Figure 14:
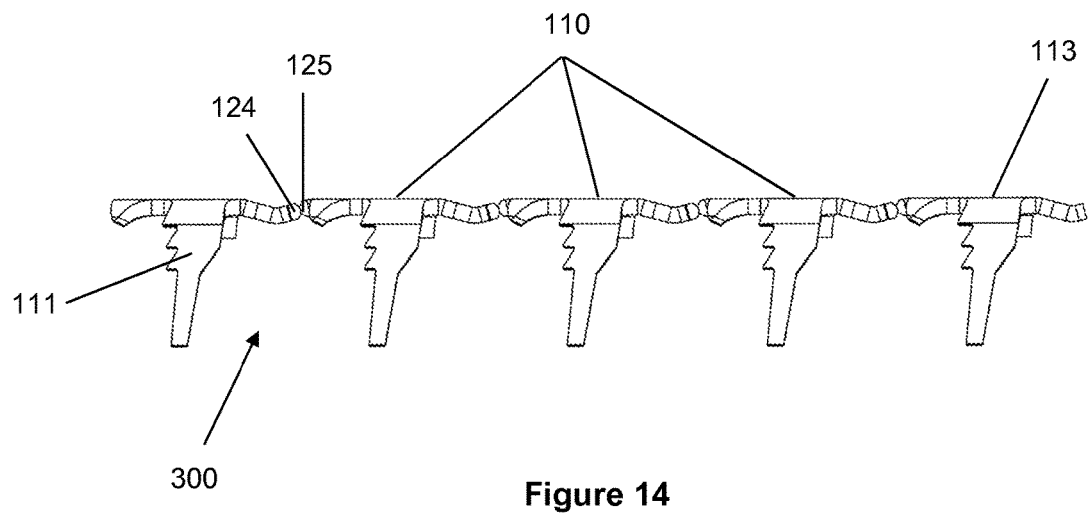
FIG. 14 is an elevation view of a collated series of the embodiment of universal fastener of FIG. 10.

FIG. 14 shows a collated series of fasteners 300 with the adjacent fasteners (110, 111, 113) connected via nose-to-tail attachment. FIG. 17 is an enlarged view of the connection between a fastener nose 125 and the tail 124 of the adjacent fastener, which has been discussed above.

Figure 15:
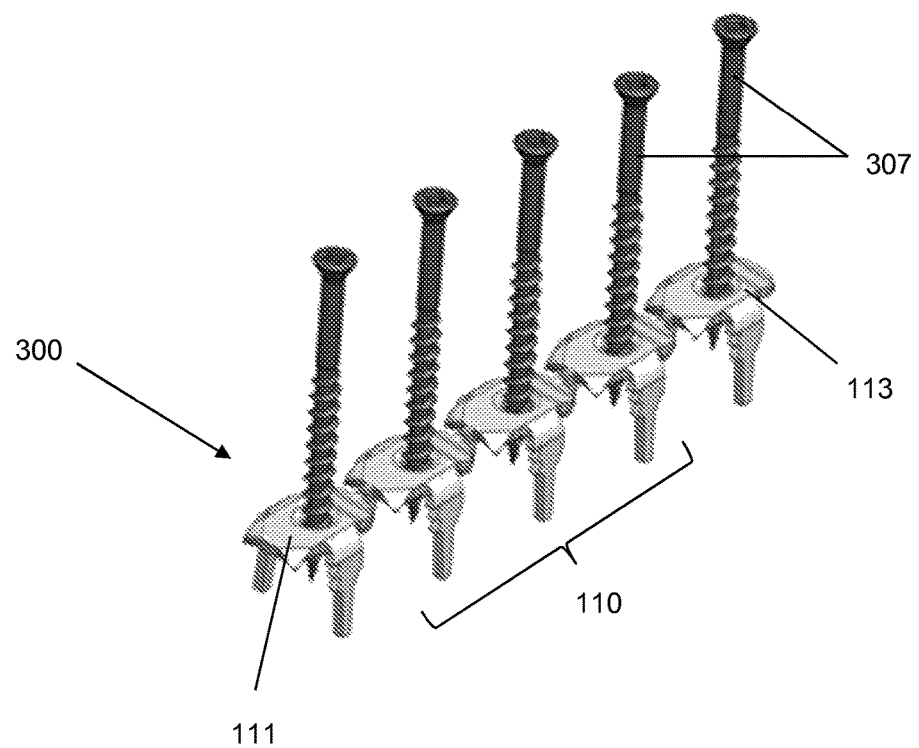
FIG. 15 shows a collated series of fasteners with pre-set elongated securing members engaged.
Figure 16:
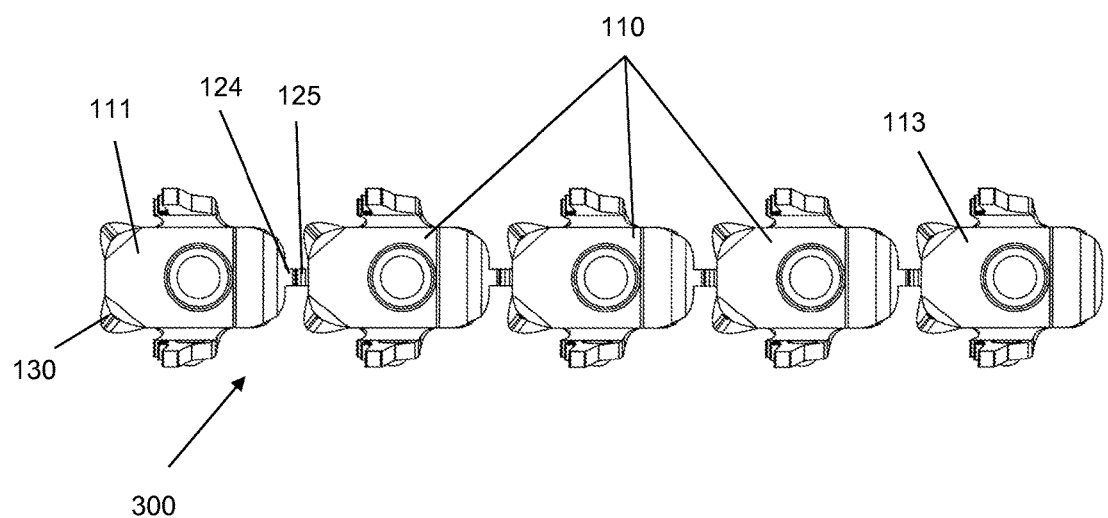
FIG. 16 is a bottom view of the collated series of fasteners shown in FIG. 14.

As shown in FIG. 10, the body 112 defines an attachment opening 118 with a reverse (downward) radial dimple 126 formed as an extrusion through the body 112. With reference to FIG. 15, the downward extruded configuration of the attachment opening 118 allows the fasteners 110 to be pre-set with elongate securing members (screws, nails, etc.), like those shown as reference numeral 307. The reverse dimple 126 contour captures and reliably maintains the securing member 307, while also improving guidance of the securing member while it is driven through the opening 118. A collated series 300 of fasteners (110, 111, 113) with pre-set securing members 307 can be loaded into a loading magazine track as a single unit, thereby decreasing the number of separate parts and increasing reliability of installation. Installation can be achieved as described above with a power driving tool or simply by hand with a hammer or screwdriver. Similarly, a collated series of fasteners without pre-set securing members can be loaded into a driving tool as well. The configuration of the attachment opening 118 depicted in the Figures is non-limiting. Embodiments exist having variations of the depicted configuration, including as a half or partial extrusion through the body 112 for maintaining securing members.

Packaging and handling of the above-described pre-set fastener/securing member assemblies may cause disengagement of the securing members from the fasteners prior to use. It has been shown that an additional securement aid may be employed to provide additional adhesion between the respective securing members and fasteners. Such additional securement aids may include without limitation bushings, adhesives, grommets or eyelets.

With respect to all embodiments, the generally U or C-shaped fasteners having a substantially flat body between two opposite legs facilitates alignment and carrying of the fasteners (in a collated series or otherwise) on a rail advancement or delivery system (similar to a staple gun). The fastener legs can be bellowed slightly outward away from the central axis, as depicted by shoulders 34 and 134. The front edge of the legs 114 and 115, and shoulder 134 can cooperate with a positive stopper mechanism of an automatic feeding system (usually toward the front end) to aid in alignment before attachment via a driven securing member. Preferably, the positioning of the attachment opening and legs relative to the front and rear of the fastener body allows installation of the fastener with the securing member as close to tangent with the front edge of the decking plank. This position of the fastener has been shown to provide the optimal gapping between adjacent planks, as well as allows for relatively facile extraction of the fastener after the deck is complete as may be necessary for repair or disassembly.

The undercut portion, 43 and 143, in the rear edges of the respective legs, 14, 15, 114 and 115 (and/or the legs of the earlier embodiments), allows installation of the trailing decking plank at the rear end of the attached fastener into a closer abutment with the already-attached plank. Spacing between adjacent planks is minimized. This configuration and arrangement allows the adjacent decking planks to overlap and substantially cover or conceal the attached fasteners (10, 100, 110, 111, 113, etc.) from view.

Preferably, adjacent fasteners in a collated series (see FIGS. 3, 14-16) are rigidly connected via their respective adjacent noses and tails. The strong, rigid engagement allows application of a stronger frontward force (by a rear spring charge or otherwise) without a substantial risk of the series of fasteners buckling or the individual fasteners inadvertently detaching. The notches 136 (see FIG. 17) at the nose-tail interface facilitate severance of the front fastener from the adjacent fastener in the series by driving a securing member through the attachment opening. The entire series may be formed from a single sheet of rigid, strong formable material such as steel or another metal by a stamping or like process.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

The invention claimed is:

1. A fastener for attaching a decking member to a support member, comprising a body extending from a front end to a rear end and including a generally flat portion defining a plane extending between two opposing lateral edges, the body defining an attachment opening extending from a top surface to a bottom surface thereof, a first shoulder extending from one lateral edge and transitioning to a downwardly projecting first leg and an opposite second shoulder extending from the opposing lateral edge to a downwardly projecting second leg, each leg having a front edge that is angled obliquely relative to the plane in the forward direction and having a rear edge with an undercut portion.

2. The fastener of claim 1, wherein each leg has at least one prong projecting from a front edge, each prong is defined by an upper edge extending obliquely from the leg front edge and a lower edge extending from the leg front edge substantially parallel to the plane defined by the flat portion of the body.

3. The fastener of claim 1, comprising a radial dimple surrounding the attachment opening projecting from the top surface of the body.

4. The fastener of claim 1, wherein the attachment opening is formed as an extrusion through the body from the top surface, the extrusion defining a reverse dimple surrounding the attachment opening.

5. The fastener of claim 1, comprising teeth formed as downward bends from two opposing corners of the front end of the body.

6. The fastener of claim 1, wherein each leg extends downward at a slightly oblique angle relative to the body that is not perpendicular to the plane defined by the flat portion of the body.

7. The fastener of claim 1, wherein each leg extends at an angle that is within 10 degrees from perpendicular to the plane defined by the flat portion of the body.

8. The fastener of claim 1, comprising a projection extending outward from one leg.

9. The fastener of claim 1, comprising a nose extending forward from the front end.

10. The fastener of claim 9, comprising a tail extending rearward from the rear end.

11. The fastener of claim 1, comprising a tail extending rearward from the rear end.

12. The fastener of claim 1, comprising a bend in the body rearward of the flat portion of the body.

13. The collated series of claim 12, wherein the bend transitions to an upwardly extending lip that is non-coplanar with the plane defined by the flat portion.

14. The fastener of claim 1, wherein the rear edge of each leg is angled obliquely relative to the plane in the forward direction.

15. A collated series of fasteners for attaching a decking member to a support member, comprising:
(a) a first fastener with a body extending from a front end to a rear end and including a generally flat portion extending between two opposing lateral edges, the rear end having a tail projecting rearward therefrom, the body defining an attachment opening extending from a top surface to a bottom surface thereof, a first leg extending downward from one lateral edge of the body and an opposite second leg extending downward from the opposing lateral edge of the body, the bottom surface of the first fastener body defining a first plane, and each leg having a front edge that is angled obliquely relative to the first plane in the forward direction and having a rear edge with an undercut portion;
(b) a second fastener with a body extending from a front end to a rear end and including a generally flat portion defining a second plane extending between two opposing lateral edges, the front end having a nose projecting frontward therefrom, the body defining an attachment opening extending from a top surface to a bottom surface thereof, a first leg extending downward from one lateral edge of the body and an opposite second leg extending downward from the opposing lateral edge of the body, the bottom surface of the second fastener body defining second plane, and each leg having a front edge that is angled obliquely relative to the second plane in the forward direction and having a rear edge with an undercut portion; wherein
the first fastener tail is attached to the second fastener nose such that first and second fasteners are positioned with the first and second planes being coplanar.

16. The collated series of claim 15, wherein the attachment of the tail to the nose may be broken by force of driving of an elongated securing member with a shank and a head through the first fastener opening in an axial direction while maintaining the second fastener generally axially stationary.

17. The collated series of claim 15, comprising a nose projecting frontward from the first fastener front end.

18. The collated series of claim 15, comprising a tail projecting rearward from the second fastener rear end.

19. The collated series of claim 18, comprising a third fastener with a body extending from a front end to a rear end and including a generally flat portion extending between two opposing lateral edges, the front end having a nose projecting frontward therefrom, the body defining an attachment opening extending from a top surface to a bottom surface thereof, a first leg extending downward from one lateral edge of the body and an opposite second leg extending downward from the opposing lateral edge of the body, wherein the bottom surface of the third fastener body defines a third plane, the second fastener tail is attached to the third fastener nose such that first, second and third planes are coplanar.

20. The collated series of claim 15, wherein the rear edges of each of the legs in the first fastener is angled obliquely relative to the first plane in the forward direction.

21. The collated series of claim 15, wherein the first fastener and second fastener each includes teeth formed as downward bends from two opposing corners of the front end of the body of the respective fastener.

* * * * *